Sept. 11, 1956  G. W. RATHENAU  2,762,898
SOLDERING METHOD AND SOLDERING DEVICE
Filed Aug. 23, 1952

INVENTOR
GERHART WOLFGANG RATHENAU
BY
AGENT

United States Patent Office 2,762,898
Patented Sept. 11, 1956

2,762,898

SOLDERING METHOD AND SOLDERING DEVICE

Gerhart Wolfgang Rathenau, Eindhoven, Netherlands, assignor to Hartford National Bank and Trust Company, Hartford, Conn., as trustee Application August 23, 1952, Serial No. 306,052

Claims priority, application Netherlands September 27, 1951

5 Claims. (Cl. 219—26)

The invention relates to methods of soldering and to devices for carrying out this method.

The terms "soldering" is to be understood to mean herein the coating of a metal or metallized body with a metal layer and the connection of a plurality of these objects to one another by means of such a metal layer.

It is known to use a reducing atmosphere or a flux dissolving metal oxides for soldering. With a reducing atmosphere it is common practice to use a furnace, into which the objects to be soldered, provided with solder are introduced and then heated to such a temperature that the solder becomes liquid. Particularly with the soldering of large numbers of small objects, such as parts of electrotechnical apparatus, this method is complicated. In such cases the use of flux is therefore often preferred. However, it is then difficult to obtain a satisfactory connection, particularly with the soldering of metals having an oxide surface which is reduced with difficulty. Moreover, residues of flux may be difficult to remove, which residues may, moreover, give rise to corrosion.

The object of the present invention is to obviate these disadvantages in a simple manner.

According to one aspect of the invention a method of soldering in a reducing gaseous atmosphere is characterized in that the objects to be soldered are brought into contact, in an open vessel traversed by a reducing gas, with liquid soldering metal provided on a heating body in the vessel, this body having a thermal capacity such that, owing to the contact with the liquid metal the objects can be heated to the temperature required for soldering, the objects being taken out of the vessel, after the areas of soldering are covered with the soldering metal.

According to a further aspect of the invention, a device for carrying out this method, comprises a vessel having a gas supply duct and an apparature for introducing the objects and containing a heating body on which soldering metal may be melted.

Figure 1:
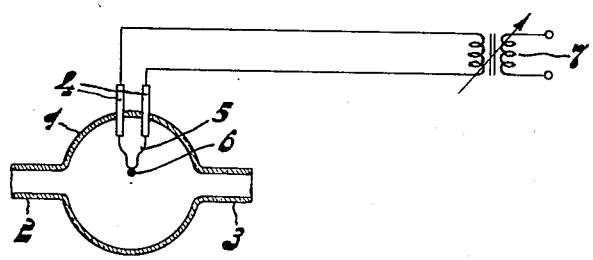
Figure 2:
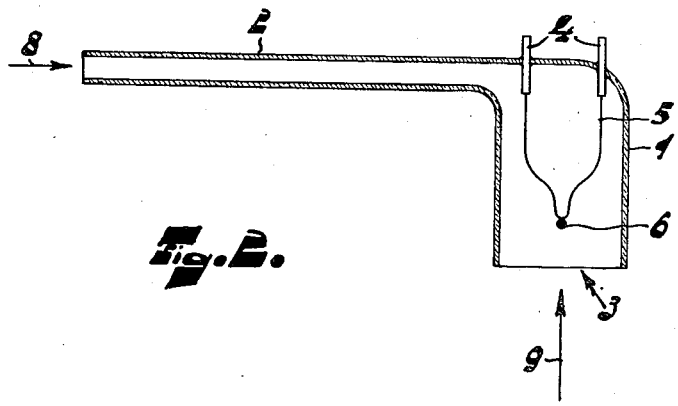

In order that the invention may be readily carried into effect, it will now be described in detail with reference by way of example to the accompanying drawing in which;

Fig. 1 is a sectional view of a soldering device constructed in accordance with the invention; and Fig. 2 is a modified form of the soldering device shown in Fig. 1.

For establishing a soldering joint between a chromium-nickel wire wound on a ceramic body and a wire of pure nickel use may, for example, be made of a device as shown in Fig. 1. It comprises a glass bulb 1 having a gas supply tube 2 and an aperture 3. Through the supply tube 2 into the glass bulb 1 flows a reducing gas of a mixture of 25 parts of hydrogen and 75 parts of nitrogen, having a dew point of —90° C. The bulb is filled and the excess gas flows away through the aperture 3. In the glass bulb are sealed two metal pins 4, to which a molybdenum wire 5 of about 1 mm. of thickness, having a loop in its centre, is connected inside the bulb. To this loop is fastened a piece of euctectical silver solder 6 and the metal pins are connected to a variable transformer 7.

The current is adjusted to be such that the solder melts and remains suspended as a drop 6 on the wire. A chromium-nickel wire, 20μ thick, wound about a ceramic core, and a nickel wire, 0.5 mm. thick are introduced through the aperture 3 into the vessel. The two wires are immersed with the area to be soldered into the molten silver drop and withdrawn from the drop together. Immediately after the wires have been withdrawn from the drop, the metal solidifies and the soldering joint is ready. Any chromium oxide is reduced in the reducing gaseous atmosphere, which is kept completely free from oxygen, if the temperature of the drop is accurately checked and the joint is established without excessive heating or oxide occlusions. The quality of the joint thus established is excellent and the corrosion, which often occurs with joints established with the use of flux, does not occur, even if the conditions with respect to temperature and moisture are unfavourable. The products of the reaction between the reducing atmosphere and any oxides are conducted away by the flow of gas. This device permits of establishing a great number of such joints, the rate being determined only by the time between the withdrawal of the objects and the introduction of new objects. It is necessary to replenish the supply of soldering metal.

If use is made of a device which primarily corresponds to that shown in Fig. 1, from which it differs only in that the vessel has not only a supply tube for the reducing gas but also two apertures lying diametrically opposite, the axes of which coincide with the suspended metal drop, a chromium wire may be continuously coated with a solder layer by the method in accordance with the invention. The chromium wire of, for example, 0.03 mm. of thickness is then drawn continuously through the silver drop in the device at a rate of 5 cms. per second.

Fig. 2 shows another embodiment of the device in accordance with the invention. The device is shaped and is used in the manner of a soldering-iron, the handle of which serves at the same time as a supply tube for reducing gas 8. This device permits of touching areas to be soldered, which cannot be introduced into the device, for example, for structural reasons. The various parts of this device, which are designated by reference numerals correspond to the parts of the device shown in Fig. 1, designated by the same reference numerals.

It should be noted that with the method in accordance with the invention no electrical current passes through the objects, which are coated with metal. With this method no melting phenomena in the objects due to heating by the passage of current through the objects occur. However, it is evident that the heat required for a satisfactory soldering joint must be supplied by the molten mass of soldering metal; this heat is produced by the flow of current through the wire 5. It is evident that the method in accordance with the invention is of particular advantage with comparatively small objects; in this case excessively large heating bodies are not required to avoid undue cooling of the molten soldering metal.

What I claim is:

1. A portable device for soldering metallic objects comprising an open vessel having a reducing gas atmosphere therein, a heating element secured to and contained within said vessel, solder material secured directly to said heating element, said heating element having a thermal capacity such that said solder material is melted and remains suspended as liquid solder from the heating element, said metallic objects having their areas to be soldered immersed in said liquid solder and withdrawn therefrom thereby solidifying said liquid solder, an opening for the supply of said reducing gas, and an aperture for introducing said objects to be soldered.

2. A device as set forth in claim 1 wherein said heating element is a wire, and means for producing an electric current for said wire.

3. A device as set forth in claim 1 wherein said heating element is a molybdenum wire having a loop upon which said solder material may be melted.

4. A device for soldering metallic objects comprising an open vessel having a reducing atmosphere therein, a wire heating element, means for producing an electric current for said wire, means mounting said wire heating element within said vessel, solder material secured directly to said wire heating element, said heating element having a thermal capacity such that said solder material is melted and remains suspended as liquid solder from the heating element, said metallic objects having their areas to be soldered immersed in said liquid solder and withdrawn therefrom thereby solidifying said liquid solder.

5. A device for soldering metallic objects comprising an open vessel having a reducing atmosphere therein, a molybdenum wire heating element provided with a loop, means for producing an electric current for said wire, means mounting said wire heating element within said vessel, solder material secured directly to the loop of said wire heating element, said heating element having a thermal capacity such that said solder material is melted and remains suspended as liquid solder from the heating element, said metallic objects having their areas to be soldered immersed in said liquid solder and withdrawn therefrom thereby solidifying said liquid solder.

References Cited in the file of this patent

UNITED STATES PATENTS

| | | |
|---|---|---|
| 2,214,108 | Nichols | Sept. 10, 1940 |
| 2,216,519 | Quarnstrom | Oct. 1, 1940 |
| 2,404,157 | Ahalt | July 16, 1946 |
| 2,501,192 | Scholler | Mar. 21, 1950 |
| 2,593,947 | Weller | Apr. 22, 1952 |
| 2,608,745 | Barry | Sept. 2, 1952 |

FOREIGN PATENTS

| | | |
|---|---|---|
| 329,459 | Great Britain | May 22, 1930 |
| 385,285 | Great Britain | Mar. 17, 1931 |